Feb. 7, 1939.                R. A. LANDREY                2,146,399
                                MOWER
                         Filed Feb. 8, 1937          4 Sheets-Sheet 1
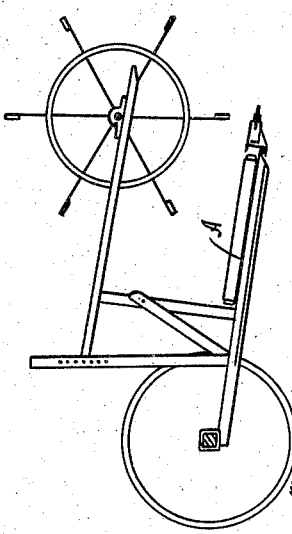
FIG. 2
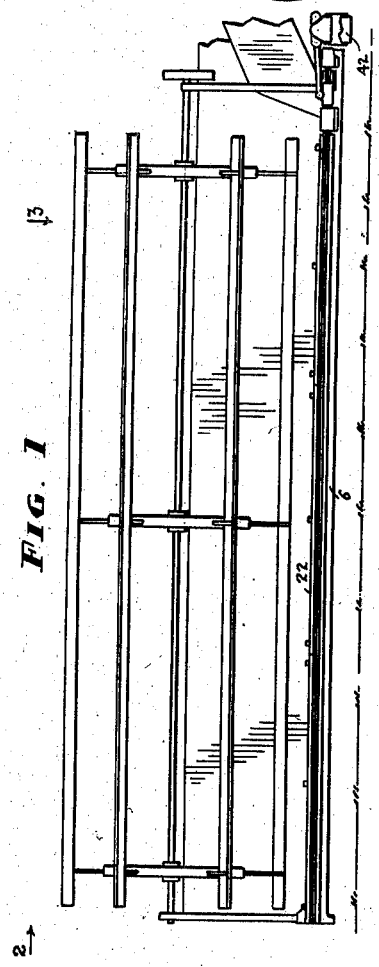
FIG. 1
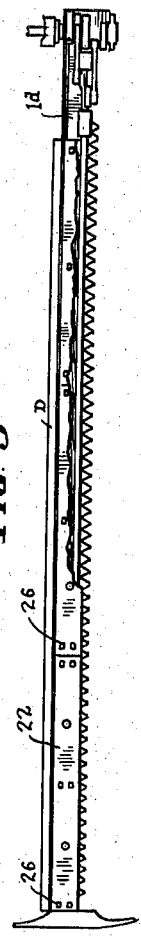
FIG. 3
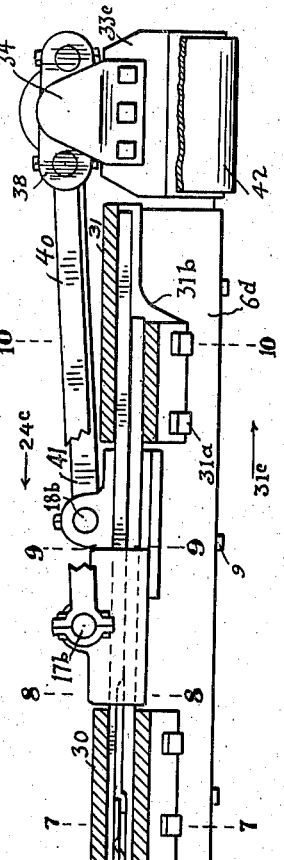
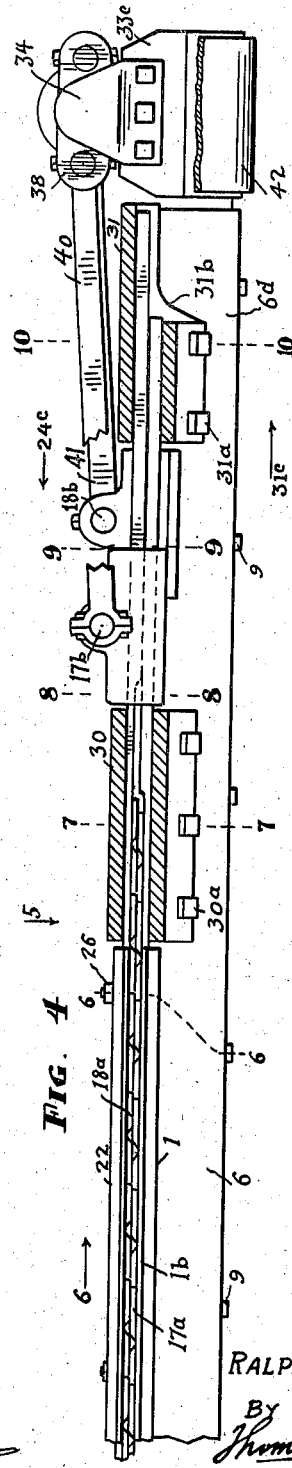
FIG. 4
INVENTOR
RALPH A. LANDREY
By
Thomas L. Ryan
ATTORNEY.

Feb. 7, 1939.  R. A. LANDREY  2,146,399
MOWER
Filed Feb. 8, 1937  4 Sheets-Sheet 2
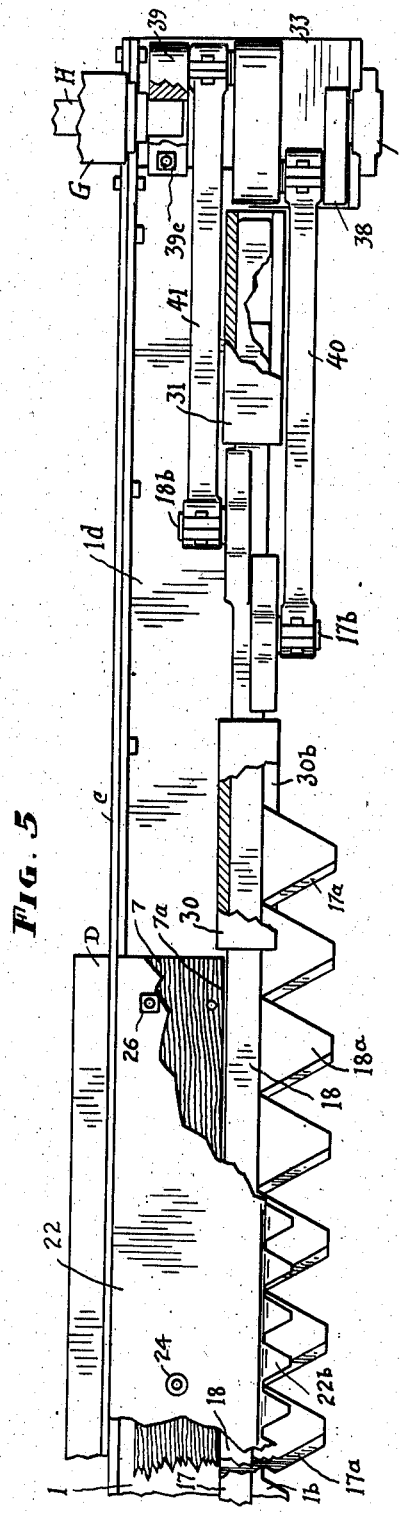
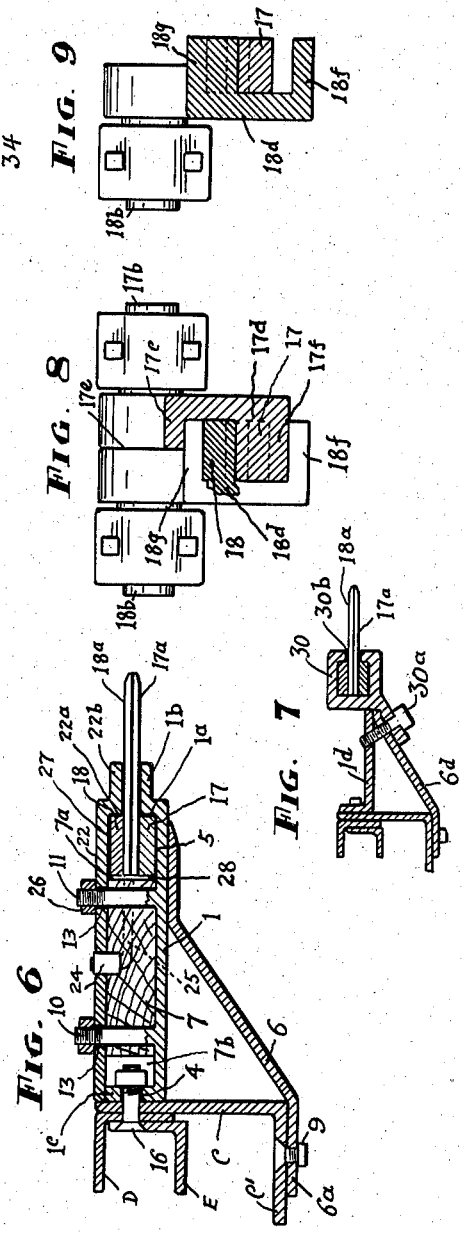
INVENTOR.
RALPH A. LANDREY
BY Thomas L. Ryan
ATTORNEY.

Feb. 7, 1939.  R. A. LANDREY  2,146,399
MOWER
Filed Feb. 8, 1937  4 Sheets-Sheet 3
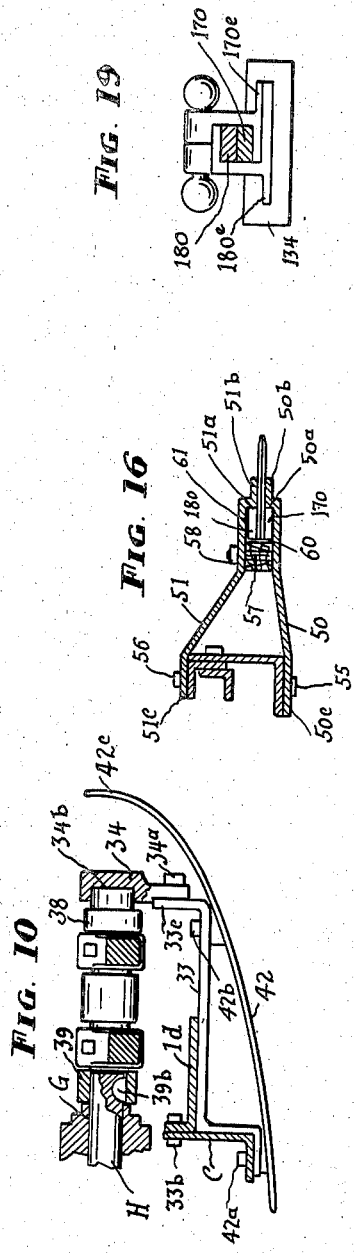

Feb. 7, 1939.　　　　R. A. LANDREY　　　　2,146,399
MOWER
Filed Feb. 8, 1937　　　　4 Sheets-Sheet 4

INVENTOR.
RALPH A. LANDREY
BY
ATTORNEY.

Patented Feb. 7, 1939

2,146,399

UNITED STATES PATENT OFFICE 2,146,399

MOWER

Ralph A. Landrey, Muncie, Ind.

Application February 8, 1937, Serial No. 124,608

7 Claims. (Cl. 56—296)

This invention relates to mower mechanisms of the type used in agricultural implements such as binders, mowers, reapers, harvesters and the like. In the advanced designing and constructing of harvesting implements has come the combine or combined harvester-thresher, which is adapted to be drawn over the field and as it travels, to mow the standing crop, and to gather, thresh and separate it. Whereas this machine has been used almost exclusively in the arid and semiarid regions for the handling of wheat crops, there is now a demand that it may be availed of in the more humid regions in the handling of other crops as well as wheat, such as beans, soy beans in particular, rye, oats, barley, buckwheat, flax, rice, certain strains of corn, clover, grass, grain sorghum, and the like.

The new requirements dictate that the machine must be effective under varied climatic conditions such as moisture, temperature, and seasons, and under varied physical conditions and characteristics of the soil and of the crop.

Inasmuch as the proper performance of the combine under all conditions requires that all of its mechanisms shall function uninterruptedly as the field is traveled, it is of major importance that the mower mechanism shall be capable of operating dependably and effectively.

To provide a mower mechanism whereby the aforenamed advantages may be attained, is the general object of my invention. Further and more specific aims are to provide a mechanism of the kind referred to which is economical of construction, practicable to install, durable, serviceable, efficient and fast.

The objects of my invention are accomplished by the new construction, combination and arrangement of parts illustrated in the accompanying drawings, and described in the following specification.

In the drawings—

Figure 1 is a diagrammatic front view of that portion of a combine which embodies the platform over which the draper or some sort of conveyor is operated, the mower mechanism being positioned at the front edge of this platform. The machine shown herein is of the larger type wherein the reach of the mower mechanism is about sixteen feet.

Figure 2 is an end view, in the direction of arrow 2 in Figure 1.

Figure 3 is a dagrammatic top plan view of my improved mower mechanism, taken in the direction of arrow 3 in Figure 1.

Figure 4 is an enlarged detail front view illustrating the construction and co-related positions of the several parts of my invention, as exemplified in form which is intended for machines of the larger capacity.

Figure 5 is a top plan view, in the direction of arrow 5 in Figure 4.

Figure 6 is an enlarged cross section view taken on the line 6—6, and in the direction of arrow 6 in Figure 4.

Figure 7 is a cross section view taken on the line 7—7 and as seen in the direction of arrow 6 in Figure 4.

Figure 8 is an enlarged cross section view taken on the line 8—8, in the direction of arrow 6 in Figure 4.

Figure 9 is an enlarged cross section view taken on the line 9—9 in the direction of arrow 6 in Figure 4.

Figure 10 is a cross section view taken on the line 10—10 and as seen in the direction of arrow 6 in Figure 4.

Figure 16 is a modification showing the invention exemplified in a form of construction and arrangement more particularly adapted to machines generally, such adaptation being especially for machines in which sickle accessibility and extreme rigidity are of minor importance.

Figure 17 is a top plan view of Figure 16, portions of the frame structure being broken away.

Figure 18 is a side view of wrist block and guideway structure and arrangement of modified form.

Figure 19 is a vertical cross section view taken on the line 19—19 and as seen in the direction of arrow 19 in Figure 18.

Figure 11:
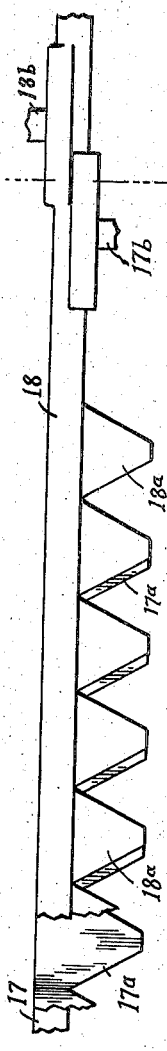
Figure 11 is a plan view of the sickles in their extreme opposed positions.
Figure 12:
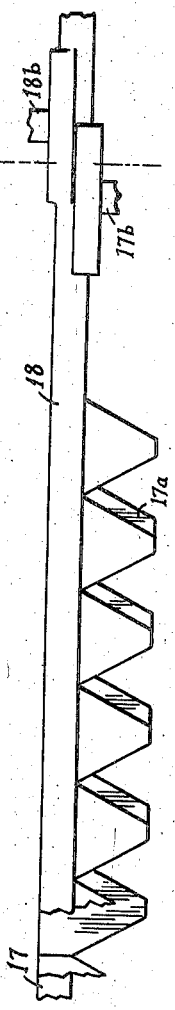
Figure 12 shows their positions, at one eighth revolution of crank.
Figure 13:
Figure 13 shows their position, at one quarter revolution of crank.
Figure 14:
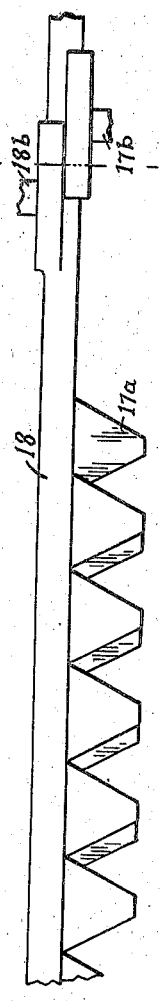
Figure 14 shows their positions, at three eighths revolution of crank.
Figure 15:
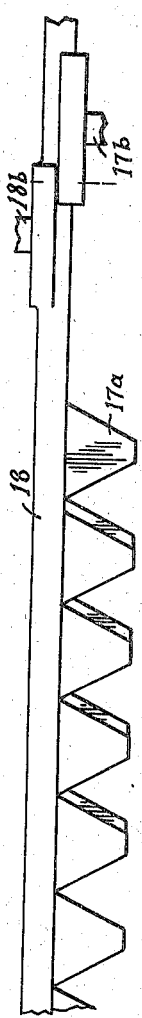
Figure 15 shows the respective positions of the sickles at one half revolution of the driving crank.

The invention has to do with a mower mechanism of the type which comprises sickles (by the word sickles, being meant bars upon which cutter knives are arranged and secured in successive order) which are operable reciprocatively simultaneously in opposed directions.

In maturing my invention I have proceeded upon the thought that the sickles should present an unobstructed front to the standing crop, and accordingly, that guards, finger bars and like devices should be dispensed with, thereby eliminating at the start, a cause of much of the clogging and choking difficulties in the operating of mowers generally when conditions are not entirely favorable. I have considered that the sickles should be so supported and retained slidingly that while their movement reciprocatively is free and easy, their cutting blades should be held in close and efficient shearing relation, and that they should be supported against tendency toward bending or breaking when abnormal growths or foreign objects such as loose rocks are encountered.

In the present description, my invention is exemplified in an embodiment intended for use in connection with a combine of conventional design and wherein the gathering platform A may be poised at such height and incline as may be desired, for example, as shown in Figure 2. That portion of the edge of this platform which faces toward the crop, and which is termed a fore beam, may consist of a member C, angle shaped in cross section, combined with the similar but lighter members D and E. It is of length dictated by the size and capacity at which the combine is rated, such length, in the present instance, being about sixteen feet, and as hereinbefore mentioned.

I provide a slideway structure which consists of elongated body members arranged in parallelism and embodying opposed slideway surfaces for engagement by the sickle bars and the knives thereof, means to stay these body members in spaced relation, and the said body members, at their portions rearwardly of the slideway facings, being adapted for connection to the platform of the machine. A stout metal bed plate 1 whose frontal portion is turned upwardly and thence forwardly, thus constituting an upright slideway face 1a and protruding lip 1b, has its rearward portion bent upwardly to constitute a leg 1c in which are provided holes 4 suitably spaced for the reception of fastener means for securing the said bed plate to the said forebeam. Provided in the said lip 1b are spaced V shaped throat openings in successive order and which are of the full depth of the cutting zone of the knives presently to be referred to, as depicted in the plan view Figure 5. An elongated stout metal plate which is of length substantially that of bed plate 1, is designated as a stay 6. Its frontal portion, bent at a suitable angle, is integrated with the underside of the frontal portion of the said bed plate 1. The rear marginal portion of this stay member 6 is bent at a suitable angle constituting a flange 6a which is adapted to be secured to the underside of the leg C1 of the forebeam, as shown in Figure 6. To secure the said flange 6a to the said fore beam, bolts 9 are made fast in the holes provided therefor in said flange, and in the leg C1 of the fore beam.

Threaded studs 10 and 11 project upwardly from the said bed plate 1, as shown in Figure 6. Seated on the said bed plate is a body bar 7 which is of predetermined width and thickness, and is preferably of wood such as maple which is close grained and substantial. It constitutes a space member by which the top or cover sections presently to be described, are firmly supported at a predetermined distance from the plane of said bed plate 1. The frontal face of said body bar 7 is designated 7a. In holes 13 which are suitably spaced in said body bar, the studs 10 and 11 are received.

Referring now to Figures 3, 4 and 5, it will be observed that the bed plate 1 includes a longitudinal extension 1d; and that the stay member 6 includes a longitudinal extension 6d. The functions of these extensions will presently be referred to. Bolts 9 and 16 (see Figure 6) which are made fast at the flange 6a of the stay member, and at the rear leg 1c of the bed plate, respectively, secure the structure just described, to the fore beam structure C—D—E.

The sickles consist of similar stout slender metal bars 17 and 18 with which are integrated the knives 17a and 18a, similar in form, and arranged in successive order, as shown in plan in Figure 5. The said sickle bars are disposed in their related positions as depicted in Figure 6, one bar 18 being above the other 17, and the beveled edges of the knives of one sickle being inclined toward the flat faces of the knives of the other sickle.

The top member of said slideway structure consists of plate metal sections 22, each embodying an upright slideway face 22a and a protruding lip 22b. Provided in said lip are spaced V shaped throat openings which are of the full depth of the cutting zone of the knives, as shown in Figure 5. In holes suitably spaced in said plate sections 22, are received the ends of the aforesaid studs 10 and 11 (see Figure 6). The thickness and width of the aforesaid body bar 7 are such as to afford space 7b for inserting the bolts 16, and to provide clearance 27 above the upper sickle bar 18, and clearance 28 at the rear of both of the sickle bars.

The bolts 16 having been tightened (thereby uniting the bed plate 1 with the forebeam of the machine 0, and the sickles 17 and 18 and the body bar 7 having been placed in position, the several top sections 22 are now disposed in place. Screwing down of nuts 26 on the studs 10 and 11 bring the plates 22 down to tight relation with the said body bar 7, thus completing the slideway structure. At registration with spaced openings in the top plates 22, lubricant cups 24 of the Zerk type are seated in body bar 7 and from which lubricant may pass through channel 25 to the interior of the slideway.

The extensions 1d and 6d of the bed plate 1 and stay member 6 respectively, (see Figures 4 and 5) project beyond the zone of the knives, and they constitute a support and anchorage for guideway structures 30 and 31 in which are received and are slidingly retained, the heads (presently to be referred to) of the sickles. They also constitute support and anchorage for plate 33 of a frame structure upon which the outer bearing of the sickle driving mechanism (presently to be described) is sustained. The said guideway structures (see Figures 4 and 7) are secured by cap screws 30a and 31a to the extensions 1d and 6d of the bed plate 1 and stay member 6, respectively.

The function of these guideway structures is to so retain the head ends of the sickles, that they and the wrists thereof, may travel in true alignment. The function of longitudinal slot 30b in the structure 30 will be presently referred to.

The underneath portion of the guideway structure 31 is of cutaway formation 31b as shown in Figure 4.

The frame structure which sustains the sickle driving mechanism, comprises a stout metal plate 33 whose inner end is secured to the extended portion 1d of the aforesaid bed plate, and to the part C of the forebeam of the machine, as by bolts 33b. Removably secured to upturned leg 33c at the forward end of said plate 33, as by cap screws 34a is a head member 34 which embodies a journal bearing 34b. This bearing is in alignment with a journal bearing G in which is journaled the drive shaft H (not shown) and which said bearing G and shaft H are a part of the machine proper.

A double throw crank member of relatively short dimensions, as shown in Figure 5 and in Figure 10, has the axis of its outer crank 38 journaled in the bearing 34b. The hub of the bifurcated inner crank 39 is interlocked by a key 39b in a keyway of the shaft H; and it is secured by a clamp bolt 39c. Thus the double crank member, while being secured to the said shaft H so that it is rotated by the latter, is removable by the loosening of the said clamp bolt 39c.

Pitmans 40 and 41 have their heads journaled on crank pins 17b and 18b of wrist blocks which are integrated with the extended or head portions of the sickle bars 17 and 18, respectively, and which said extended portions may be designated as sickle heads. Each of these sickle heads is of suitable area and formation in cross section, so that it may ride in sliding coengagement with the other, and so that both may have suitable bearing coengagement with the guideway surfaces of the guideway structure, as depicted in Figure 4, and in cross section in Figures 8 and 9.

The wrist block of the sickle bar 17 (see Figure 8) and which comprises pin 17b, is integrated at its side 17d with the edge, and at its inturned bottom flange 17f, with the underside, of the head portion of the lower sickle bar 17. Upper flange 17c which is spaced from the plane of the top surface of the head portion of the upper sickle bar 18 has its vertical edge in alignment with the vertical center of the sickle head, and also in alignment with the vertical plane of the inner face 17e of the said wrist block of 17.

The wrist block of sickle bar 18, (see Figure 9), and which comprises pin 18b, is integrated at its side 18d with the edge, and at its inturned top flange 18g with the top surface, of the head portion of the upper sickle bar 18. Bottom flange 18f which is spaced from the plane of the underside of the head portion of the lower sickle bar 17, has its edge in registration with the vertical plane of the inner face of the adjacent wrist block.

The wrists, as above described, are in dovetailed relation, the top flange 17c being in sliding engagement with the top flange 18g, and the bottom flange 18f being in sliding engagement with the bottom flange 17f, their movement being free, smooth, and steady. Also, by reason of their being stayed against diagonal thrust from the driving elements, they operate without tendency to rock or to tilt. The movement of the sickles is accordingly, free from tendency to rock or to vibrate. The travel plane of the wrist pins is parallel with, and is approximately close to the plane of the knives; and it is approximately close to the plane of the axis of the double crank, the angle of inclination of the pitmans 40 and 41 being thereby minimized. All of the moving parts being in a zone above that in which the sickles are operating, there is maximum clearance under the sickle drives which allows the sickles to cut very close to the ground.

By referring to Figures 11 to 15, it will be seen that four shearing operations are completed at each revolution of the crank shaft, with a stroke only slightly greater than the distance between centers of two adjacent knives; and that each shearing operation is started and is finished during a relatively high sickle speed. This gives two shearing operations at each throat-opening in the slideway lips, (and which said throat-openings are spaced a distance center to center equal to one half the distance center to center of the knives) at each revolution of the crank shaft. The result is high efficiency of sickle action, with relatively low inertia forces on the sickle heads, and there is low speed operation of the driving mechanism.

The double crank member may easily be installed and adjusted to desired alignment; also it may easily be removed from its position. Thus it is possible to remove the sickles from the slideway, longitudinally. To so remove the sickles, the crank member is first removed (by disconnecting the pitmans 40 and 41, preferably, at the sickle head wrists; by detaching the head block 34; and by disconnecting the crank 39 from shaft H) and the sickles are moved to the limit of their travel in the direction of arrow 24c. Cap screws 31a of the guideway structure 31 are then removed, the said guideway structure being then shifted in the direction of arrow 31c its lower edge clearing the frame plate 33 and to a zone beyond that of the sickle heads. The sickles may now be slid in the direction of arrow 31c, the knives clearing the guideway structure 30 through slot 30b.

To remove the sickles in a manner other than as above described, they are first disconnected from the pitmans 40 and 41, and the cap screws 30a and 31a of the guideway structures are removed. Nuts 26 and top sections 22 are then removed. The sickles may now be lifted from the bed plate. An advantage in providing the top member in sections 22 that are removable is, that access may readily be had to the sickles, at such location as may be desired, when sharpening of the knives is deemed necessary.

A stout curved metal plate 42 which is made fast to the frame plate 33 and to the beam of the machine, as by bolts 42a and 42b, constitutes a runner when the mower mechanism is being operated at a plane lowered to its maximum closeness to the ground. The upwardly inclined nose portion 42c guards against any tendency of the head member 34 to impinge upon the ground.

In practicing the invention, the sickles ride freely at the front of the upright face 7a of body member 7, the front edges of the sickle bars having sliding engagement with the faces 1a and 22a of the bed plate 1 and top plates 22 respectively, the lower sickle riding on the seat 5 and the upper sickle riding freely under the ceiling 27. The knives are riding freely in face to face relation in the straight alignment dictated by, and at their rear portions they are retained between, the parallel longitudinal lips 1b and 22b. These lips so function that tendency of the knives of one of the sickle bars to be diverted from the plane of the knives of the other sickle bar is prevented, and the travel of the knives in a truly straight line is assured. The importance of this feature is that by retention of the knives in dependably straight alignment whereby the shearing action is well maintained, the full efficiency of the knives, as such, is realized. Trash, damp matted grain and soy beans, bind weed, morning glory vines, dead wire grass, are cleanly severed close to the ground at high speeds and with a minimum of vibration. And even after the knives become dulled and worn from long service and repeated abrading against rocks, the sickles continue to cut through tough matted soy beans at slightly reduced speed, without delay from choking or dragging.

It is considered that in prior designs of mower mechanisms comprising double sickles, the fact of there having been no means for keeping the knives from being diverted from true alignment, has been the chief cause of their failure.

The said bed plate 1 being resistive of shocks, the sickles operate with steadiness and without tendency to chatter. Tendency to impacting and accumulating of foreign substances at the sickles is negated, lubrication as may be desired is at all times practicable, and there is a purging automatically of such foreign particles as may work into the slideway.

The preferred positions of the sickles, when the power transmitting connections are at center, are as shown in plan, in Figure 5, and in Figure 11, the knives of the lower sickle being in advance of the knives of the upper sickle, a predetermined distance substantially as shown. By this arrangement the sickles accelerate considerably before the shearing operation begins. Although the speed at which the crank member is operating is not relatively great, the sickles both being in action, in opposed directions, the action of the knives is extremely effective.

It summarizing the merits of the invention, it may be said that it is an effective, vibrationless, speedy and superior trash type cutter mechanism. It may be utilized as regular equipment on machine as completed at the factory; or it may be supplied as an attachment for machines already in use wherein ordinary mower devices have been deemed insufficient.

Whereas in the present illustration, conventional serrated mower knives are shown, it will be understood that special knives the facing surfaces of which are of slightly concave contour may be used advantageously. Also it will be understood that strokes other than of the length as shown, may be more advantageous in instances where the invention is applied to smaller machines, and where the space occupied by the driving mechanism must be limited to relatively small dimensions, and where cutting speeds may be varied. The length of the stroke of the sickles could be reduced one half, if the rotative speed of the crank shaft was doubled; in such a modification there would be slightly greater cutting efficiency of the sickles, a reduction of torsional strain on the crank shaft, and a possible reduction of space required for the driving mechanism. Attending such a modification there would be more incapacitation of the sickle in case of a damaged knife, and there would be increased wear on the driving mechanism unless compensated for by special lubrication and by protection from dust. Further it will be understood, that a one-piece construction of the sickle heads would have the advantage of lightness, as distinguished from the built-up construction shown in the drawings and wherein a filler strip of thickness of that of the knives is integrated with the extended portions of the sickle bars proper.

In the modification illustrated in Figures 16 and 17 and which is intended for use in instances where the poise of the gathering platform of the machine may be substantially horizontal, the slideway structure consists of complemental body plates 50 and 51. At their forward portions they are bent to constitute slideway faces 50a and 51a, and the protruding lips 50b and 51b, respectively, and which said lips have V shaped notches 54 spaced and in the successive order as shown in Figure 17. The rearward portions of said plates are bent to constitute flanges 50c and 51c, their angularity being in conformity with the plane at which it is desired to operate the sickles with respect to the plane of the gathering platform (not shown). The angularities of the said slideway faces, also are variable according to whether the sickles are to be operated in a plane parallel with, or in a plane inclined toward the plane of the gathering platform. In the said flanges 50c and 51c, holes are suitably spaced, and they admit of the bolts 55 and 56 by which the said body plates are made fast to the machine.

Between the said body plates 50 and 51, a body bar consists of a stout wooden strip 57 of such thickness that when the nuts 58 of the binding bolts 59 are screwed home, the opposed faces of the slideway are spaced, and they are stayed at a predetermined distance apart. Clearance 60 at the rear side of the sickles, and clearance 61 above the upper sickle 180, are provided.

Although this modification does not possess as great strength and rigidity as does the preferred form hereinbefore described, its manufacturing cost is substantially less, and for sickles of the lesser length, the present modification is very satisfactory and practicable. It is especially advantageous in connection with platforms of the horizontal or substantially horizontal type supporting the sickles at a plane desirably close to the ground.

In applying my invention to implements and machines wherein the space within which the sickles operate, is limited, or is materially shorter than the space as shown in the present instance, the construction as illustrated in the modification (Figures 18 and 19) is used. In this modification the guideway structure for supporting and slidingly retaining the sickle heads is of unitary formation wherein the head portions of the sickle heads are embraced at the zone occupied by the wrist blocks. In this modified form of guideway structure, the body block 134 which is of the suitable length substantially as shown in Figure 18, has longitudinal guideways in which are received and slidingly retained the flanges 170e, and 180e of the wrist blocks of the lower and upper sickle heads 170 and 180. In this, as well as in the previous exemplification, of the sickle head and wrist structure, the invention lends itself to the positioning of the wrist pins at various desired planes consistent with various types of connections and driving devices desired to be used.

It will be understood by those skilled in the art to which my invention appertains, that various changes and modifications may be made in the construction and arrangement of the several parts of the invention without departing from its spirit or principle, and that the invention is to be construed as of the scope defined in the appended claims.

What I claim as my invention is—

1. A mower mechanism of the kind described, comprising a slideway structure, sickles slidingly retained therein, one upon the other, a wrist block secured to the edge and to the underside of one sickle, a wrist block secured to an edge and top side of the other sickle, the sickle edge to which one of the wrist blocks is secured being opposite to the sickle edge to which the other wrist block is secured, and each of said wrist blocks having spaced inturned flanges, the flanges of the wrist block of one sickle being in sliding engagement with the flanges of the wrist block of the other sickle.

2. In a machine of the kind described, a slideway structure carried by the machine, sickles slidingly retained therein, one upon the other, and having heads in face to face relation and which are extended beyond one end of the slideway structure, a wrist integrated with the edge and to the under side of the head of one sickle, a wrist integrated with the edge and the top side of the head of the other sickle, the side to which one of the wrists is integrated being opposite the side to which the other wrist is integrated, each of said wrists having inturned flanges, the flanges of one being in sliding coengagement with the flanges of the other of said wrists, and a detachable guideway structure in which the heads of the sickles are slidingly retained.

3. A sickle bar supporting structure of the kind described, comprising an elongated bed plate having a slideway therein at its frontal portion to receive the sickle bars, and which said bed plate embodies a forwardly protruding lip provided with spaced throat openings, a longitudinal stay plate integrated with the said bed plate to stay the latter against misalignment, a longitudinal body member on said bed plate and at the rear of said slideway, a cover plate to rest on said body member and having a slideway therein at its frontal portion, the said bed plate embodying a forwardly protruding lip provided with spaced throat openings, and means to draw the bed plate and the cover plate to, and to secure them in united relation with the said body member.

4. In an attachment of the kind described, a slideway structure, aligned sickles arranged one upon the other, which are slidingly retained in and whose ends project beyond the slideway structure, a wrist block secured to a side of the end portion of each sickle and in opposed relation, the said wrist blocks embodying flanges, the flanges of one block being secured to the bottom of the lower sickle and being in sliding engagement with the top flange of the opposite block, and the flanges of the other wrist block slidably engaging the underside of the bottom flange of the first named wrist block, and being secured to the top of the upper sickle.

5. A mower mechanism, comprising elongated body members arranged in parallel relation and embodying opposed offset slideways, the said body members being provided with longitudinal protruded lips having spaced throat openings, sickles retained slidingly, one upon the other, between said slideways, the knives thereof riding in metal to metal relation between said lips, means to stay the body members a predetermined distance apart and to constitute a bearing at the rear of said sickles, and the said body members being adapted for connection to the part of the machine facing toward the standing crop.

6. A slideway structure for sickle bars of the kind described, comprising a bed plate of elongated formation and having a frontal upturned portion and forwardly protruding lip, the latter being provided with throat openings of depth equal to that of the cutting zone of the sickle blades, a cover plate of elongated formation and having a frontal downturned portion and forwardly protruding lip, the latter being provided with throat openings of depth equal to that of the cutting zone of the sickle blades, an intermediate member to space said plates a predetermined distance apart, and means to draw and to hold the said plates in united relation with said intermediate member.

7. A slideway structure for sickle bars of the kind described, comprising a lower plate of elongated formation with frontal upturned portion embodying a forwardly protruding lip which is provided with throat openings spaced a distance center to center equal to one half the distance center to center of the blades of the sickle bar, and which said openings are of depth equal to the depth of the cutting zone of the said blades, an upper elongated plate having frontal downturned portion embodying forwardly protruding lip which is provided with throat openings spaced a distance center to center equal to one half the distance center to center of the blades of the sickle bar, and which said openings are of depth equal to the depth of the cutting zone of the blades, a body member between said plates to space them a predetermined distance apart, and means to draw and to hold said plates in united relation with said body member.

RALPH A. LANDREY.